United States Patent
Guggi

[15] 3,638,098
[45] Jan. 25, 1972

[54] INVERTER FOR GENERATING SINGLE OR MULTIPHASE CURRENT

[72] Inventor: Walter B. Guggi, Niederglatt, Switzerland
[73] Assignee: Regus AG, Regensdorf, Switzerland
[22] Filed: Apr. 14, 1969
[21] Appl. No.: 815,598

[30] Foreign Application Priority Data
Apr. 19, 1968  Switzerland .......................5852/68

[52] U.S. Cl. ...........................................................321/43
[51] Int. Cl. ........................................................H02m 7/52
[58] Field of Search ..................................321/2, 43, 44, 45

[56] References Cited

UNITED STATES PATENTS

| | | | |
|---|---|---|---|
| 3,047,790 | 7/1962 | Grosbaum et al.........................321/45 |
| 3,120,633 | 2/1964 | Genuit.....................................321/45 |
| 3,303,406 | 2/1967 | Bedford................................321/45 X |
| 3,406,330 | 10/1968 | Pelly....................................321/45 X |
| 3,483,462 | 12/1969 | Bedford...................................321/45 |
| 3,496,092 | 2/1970 | Fraser.....................................321/45 |

Primary Examiner—William M. Shoop, Jr.
Attorney—Woodhams, Blanchard and Flynn

[57] ABSTRACT

An inverter for generating single or multiphase current, comprising series networks equal to the number of phases, such networks being connected to a DC source or sources. Each said series network includes two capacitors in series connection with the common junction between the two capacitors as one load terminal which is connectable to its respective phase load. At least one electronic commutator is provided for each series network, said commutator being connected to a respective second load terminal and being switched alternately between the ends of terminals of the series network. Means are provided for triggering the commutator in sequence with and at the proper phase of the frequency of the alternating current to be generated. The inverter provides a power source for inductive current consuming appliances, particularly induction motors.

19 Claims, 8 Drawing Figures

INVENTOR.
WALTER B. GUGGI

INVERTER FOR GENERATING SINGLE OR MULTIPHASE CURRENT

The invention refers to an inverter for generating single, or multiphase current, comprising series networks equal to the number of phases, and being connected to a DC source, each such series network including two capacitors in series connection with the center tap that is, the common junction between the two capacitors, as one load terminal, being connected to its respective phase load, including at least one electronic commutator for each series network, being connected to its respective second load terminal, and being switched alternately between one of both terminals of the series network, as well as to contain means for triggering said commutator in sequence with and at the proper phase of the frequency of the AC current to be generated and particularly to provide a power source for inductive current consuming appliances, particularly induction motors.

Inverters of this type do not have electrical characteristics making them suitable for direct connection to motor drive units. This excludes the application of such inverters for a large percentage of such applications. The limitations are due mainly to the additional production as well as operating costs of such circuitry and matching elements as would be necessary in combination with the inverters mentioned before, whenever AC motors and similar equipment are supplied by such units. This would result in the addition of low-pass filters, or band-pass filters, as well as current or voltage regulators for the application of such inverters in supplying power to AC motors and similar motor drive units, resulting in lower efficiency of the inverter due to relatively high reactive currents circulating within the system.

An additional disadvantage results thereof by an increase in weight making such combinations relatively unsuitable for applications in portable equipment, such as for instance hand-tools.

The main reason for requiring such additional filter and control circuitry is the fact that known inverters generate a current and voltage waveform considerably departing from the ideal sine wave, as well as being load dependent.

To obtain a sine-wavelike current and voltage output it becomes necessary to add some form of circuitry, such as filters, tuned circuits within the inverter system. This again necessitated the addition of stabilizing means within the inverter because such tuned circuits naturally cause instability with respect to load variations, necessitating compensating means to eliminate destructive effects upon the inverter elements, or its load by such excessive current or voltage variations.

The purpose of the invention therefore was to build an inverter in which such shortcomings as being present within known inverters, can be eliminated at the same time comprising relatively simple circuitry together with improved electrical characteristics, and at the same time reducing the numbers of necessary components, making this inverter particularly suitable in combination with portable tools and equipment.

According to this invention this is achieved for inverters previously described by means of constructive unification of an inductive load with capacitors (2, 3) of the series network, respectively each series network, and being of such electrical value that the capacitive impedance of each series network which is formed by the parallel connection of each capacitor being part of such series network compensates at least partially the load impedance connected to the center tap of this series network, at half the trigger frequency generated by the electronic switching system.

A particularly advantageous connection for generating consists in supplying galvanically separated phase windings e.g., induction motors separately, respectively by separating intertied connections of finishing motors with an inverter comprising the same number of series networks according to the number of phases, such series networks being connected to a common DC source, each circuit with two capacitors at which center tap a connection exists for one of each phase terminals comprising a commutating switch connected to the other respective phase terminal, so that any interconnection between phases is accomplished through the inverter exclusively. This makes it possible to connect each series network belonging to the various phases in parallel to the DC supply source. It is also possible to connect each series network belonging to its respective phase in parallel to the DC source whenever the load includes galvanically separated windings interconnected by capacitors, or as can be the case for two-phase induction motors the phases may be already interconnected within the load.

If however the load contains a multiphase system of which the phases are interconnected the advantages of this inverter can be utilized within the same system simply by providing separate DC power sources for each phase of the inverter system.

The advantages of this system can be used as well in a system comprising a load with multiphase polygon, for example, delta connections whereby current is supplied between each tie point from series networks of an inverter system respectively its commutator connection which is part of an inverter having a separate DC source supplying each inverter section.

For the purpose of generating a multiphase AC current supplying an inductive load of which the phase voltages are in star, for example, Y-connection having a common tie point the inverter system can be extended in such a way that separate DC sources are connected to each series network comprising two capacitors at which center connection the first load terminal is connected, such load terminal being preferably the common connection of the Y-centerpoint and which inverter comprises a number of commutating switches connected to the second load terminal, and being equal to the number of phases for which the switching arrangements provide commutation between center connection and its respective phase, including provisions that interconnections between series networks are provided exclusively through the inverter system.

To prevent voltage overshoots at the capacitors forming the series network, which can easily happen under low load conditions, the inverter can be further improved by connecting diodes between the center tap of the series arrangement and the DC supply lines polarized in such a way as to be nonconductive with respect to the DC voltage. Such diodes are advantageously fitted in addition with series resistors.

The electronic commutating means applied to inverters of this type advantageously comprise two electronic switches which are alternately driven into conduction, one of which is connected between the supply buss and one terminal of the series network belonging to such commutating means, while the second one is connected between the supply buss and the second terminal of the series network. Such electronic switches being advantageously of the thyristor types comprising means for triggering of each electronic switch at its predetermined time interval whereby thyristor pairs are being triggered alternately at half cycle intervals. Furthermore it is of advantage to add a center tapped inductor in series at the center connections of each thyristor pair to provide positive commutation therefore avoiding short circuiting of the DC supply source. Such a center tapped inductor generates an opposite voltage of the conducting switching element upon the start of conduction of the nonconducting switching element and therefore turning off the conducting switching element. This arrangement can be further improved by adding capacitance between the center tapped inductor and the opposing connections of the inverter switches. This addition improves the circuit in such a way as to increase the turnoff pulse necessary to bring the commutating switch into nonconduction, providing faster and more reliable turnoff action. Furthermore to avoid overvoltages across the electronic commutating switches parallel diodes preferably with series resistors can be added between the opposite connections and the center tap of the series circuit, these diodes being connected in such a way as to be oppositely polarized with respect to the DC supply voltage.

It is known that an induction motor, or each phase thereof, can be represented by an equivalent network incorporating an inductance and a resistance, wherein the inductance may be substantially constant while the resistance varies, as with the mechanical load on the motor. A particularly advantageous application of this inverter includes a combination with an AC motor particularly an induction motor. In this case the capacities of the series network respectively of each individual series network should be dimensioned in such a way that the internal impedance of each network is equal to the inductive component of the load impedance at half the switching frequency.

The DC power source may contain rectifiers fed from an AC source. A number of separate DC sources (for multiphase inverters) can be supplied advantageously over a transformer with separate windings being supplied from a common AC source.

Inverters of this type supplied from DC sources comprising rectified AC supplies can be used advantageously as frequency inverters and particularly to transform AC current with line frequency into AC current of a higher frequency. When supplying induction motors by such frequency inverters it is possible to obtain much higher rotating speeds as compared to motors connected to the line frequency such as for instance 50 Hz. which provides a maximum motor speed of 3,000 r.p.m. Furthermore it is possible to provide continuous speed regulation of induction motors by changing the switching sequence of the electronic commutator within the inverter. Normally such speed regulation is not practical by other means for induction motors.

Based on the following figures the invention is described by two examples.

FIG. 1 shows an inverter of the type described for generating a single-phase AC current;

FIGS. 1A through 1D disclose examples of inverters of the type described for generating multiphase current.

Figure 1:
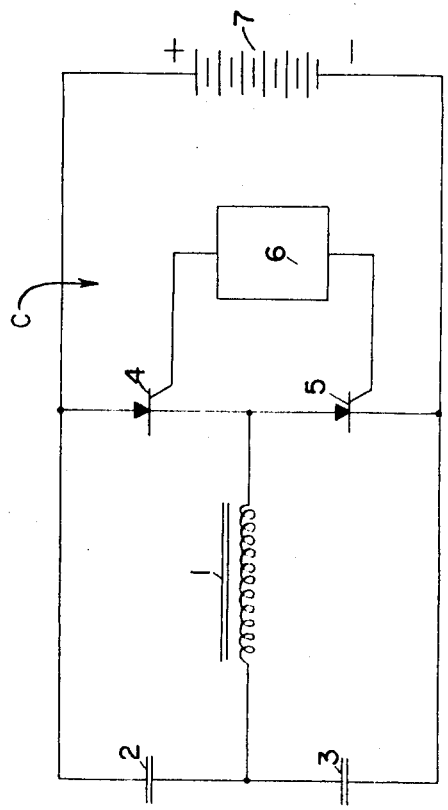
Figure 1A:
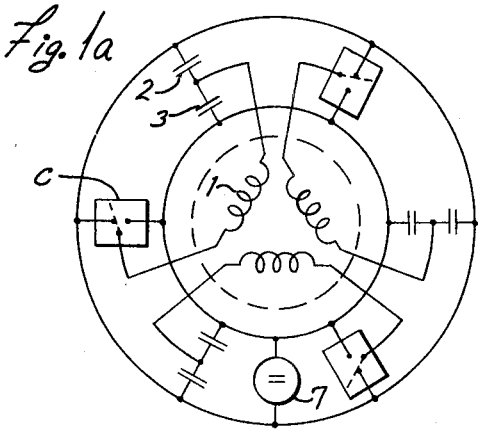
Figure 1B:
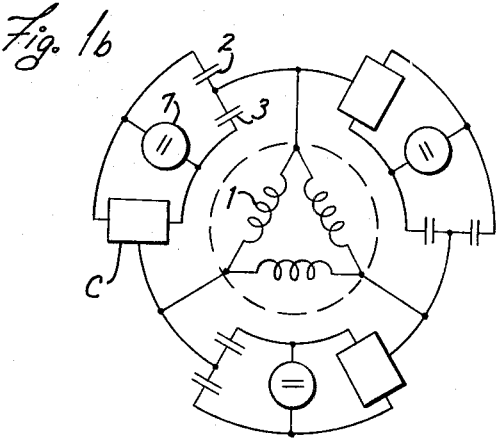
Figure 1C:
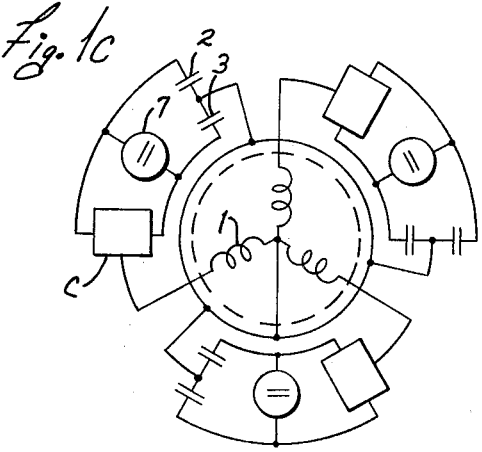
Figure 1D:
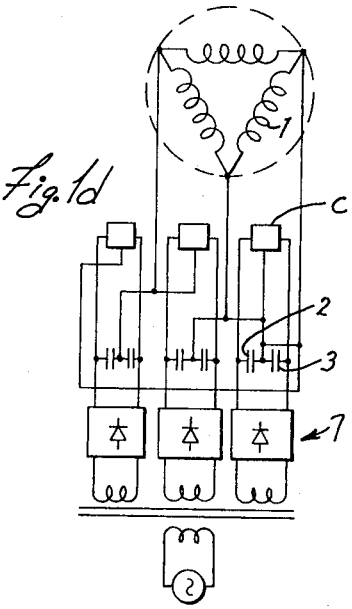

FIG. 1 shows the principle of the circuit of an inverter according to the invention, as can be used for generating a single-phase AC current. This basic circuit is part of an electric motor or inverter system, in which the inductor 1 serves as an electromechanical transducer, and at the same time serves as a means for generating sine-wavelike current variations in connection with capacitors 2 and 3. To generate and maintain such current variations it may be of advantage to separate the capacitances into two separate units. Capacitors 2 and 3 are in series connection between the positive and negative pole of the DC power source 7. The center tap of this series connection of capacitors, that is, the common junction of the two capacitors, is connected with one terminal belonging to the inductor while the other terminal of this inductor is connected to the center tap of two series connected electronic commutating switches which lie between the positive and the negative poles of the DC source, and which are shown here as thyristors 4 and 5. A triggering circuit 6 which can be of known configuration furnishes triggering pulses to the gate electrodes of these thyristors. The thyristors are connected in series, whereby the anode terminal is connected to the positive pole of the DC source 7 and the cathode terminal is connected to the negative pole of the DC source 7. This basic arrangement is capable to operate as such by itself if the time constant formed by capacitors 2 and 3 together with the inductance of inductor 1 is shorter than the duration of pulse intervals as applied to the thyristors 4 and 5 by the triggering device 6. The triggering device 6 and thyristors 4 and 5 comprise a commutator unit C.

Figure 4:
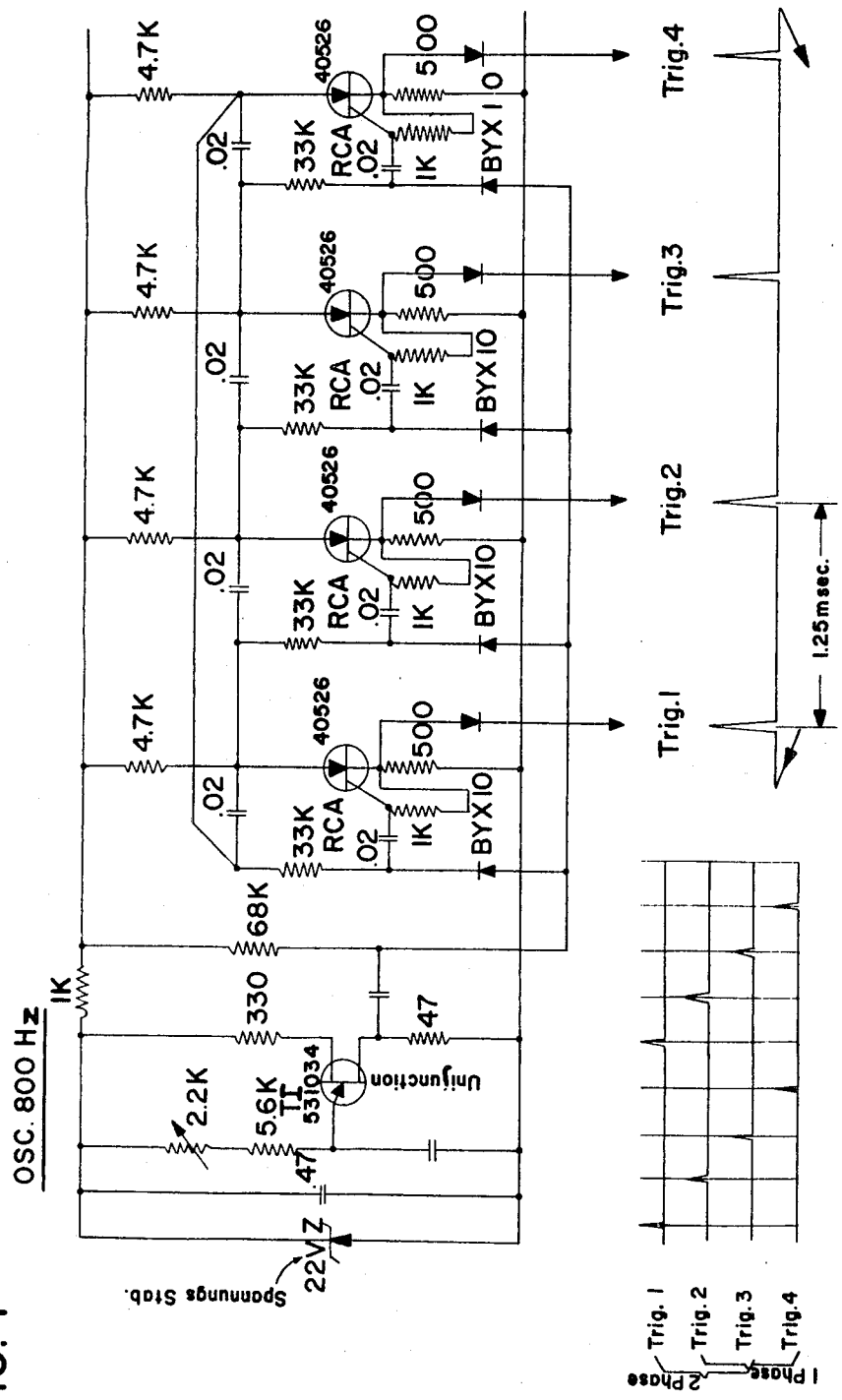
FIG. 4 shows a schematic of a trigger device for generating triggering pulses for the thyristors, as indicated by the triggering device 6 in FIG. 2.

In other words the phase angle present in the tuned circuit within the inverter as compared to the phase angle of the trigger pulses applied to thyristors 4 and 5 must be advanced to guarantee continuous operation of the system. The circuit shown in FIG. 4 has the main purpose to demonstrate the principle since it is not suitable to meet all the requirements of a complex motor drive system.

Figure 2:
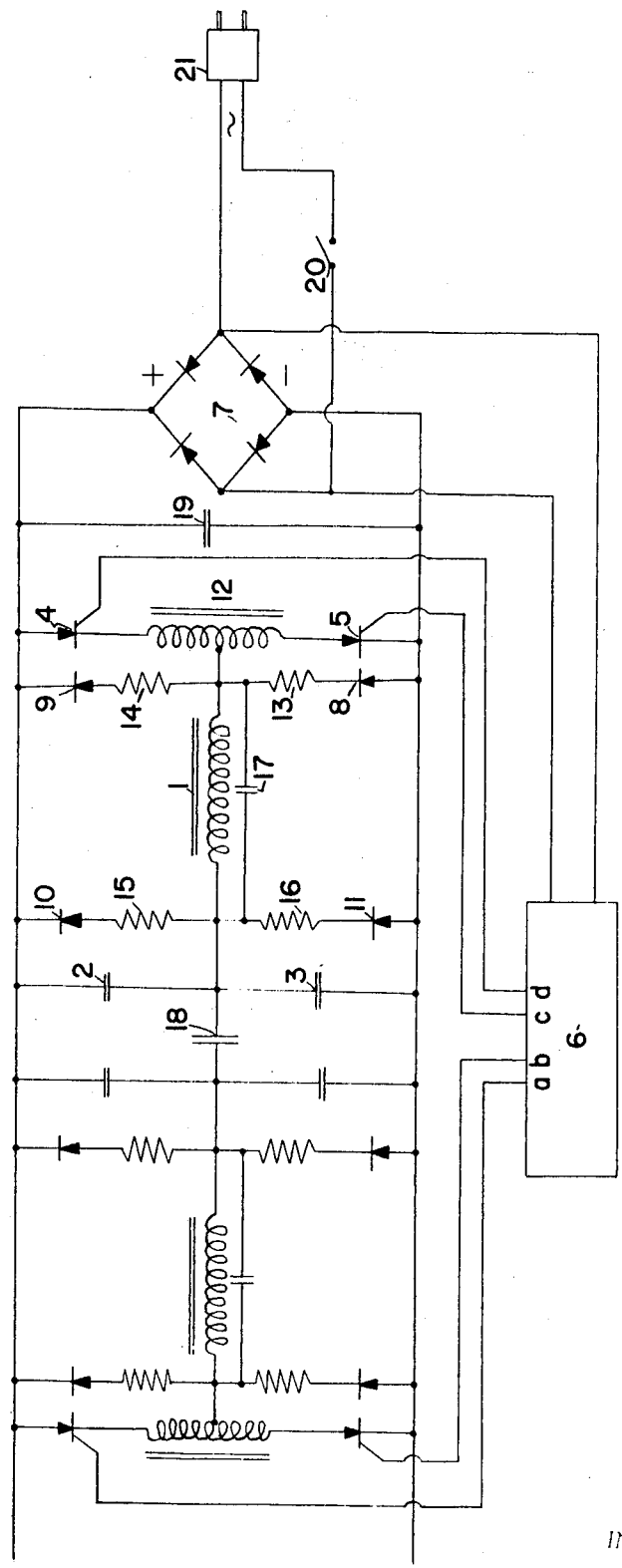
FIG. 2 shows another example of an inverter of the type described for generating a two-phase current.
Figure 3:
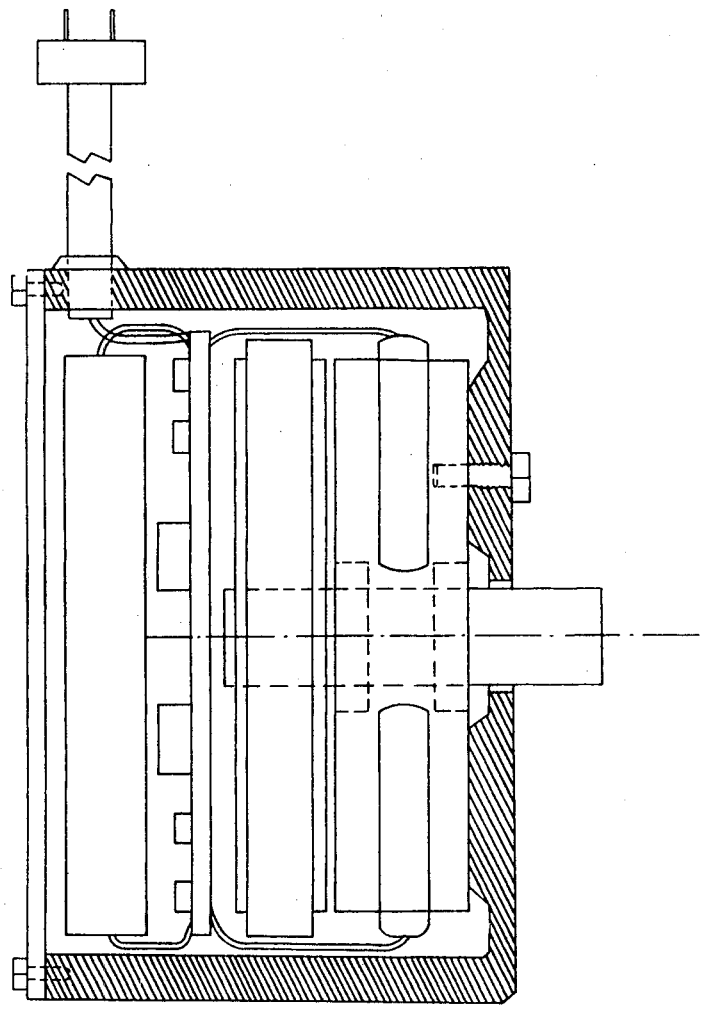
FIG. 3 shows a cross section through an induction motor which is constructively combined with an inverter of the type described.

FIG. 2 shows an improved version of the half bridge inverter including the necessary modifications and improvements to make it suitable for operation with an electric motor under various operating conditions. The following description serves the purpose of explaining such operating conditions in connection with the new methods which serve to match the circuit to the special performance requirements. The circuit shown in FIG. 2 contains the same basic elements as the circuit in FIG. 1 and includes inductors 1, capacitors 2 and 3, a DC source 7, a trigger device 6 and thyristors 4 and 5. Upon close examination of this improved circuit it is apparent that additional components have been added to modify the operating performance of this circuit and to improve its behavior. These additional components include rectifiers 8, 9, 10 and 11, center tapped inductor 12, resistors 13, 14, 15, 16 and capacitor 17. It must be pointed out, that this circuit combination can be used for each desirable phase of a multiphase motor or any other multiphase motor drive system as well as any other multiphase load. In addition a practical circuit is shown for the DC source 7 to indicate a possibility of using the inverter as a frequency converter. The DC current is retrieved from an AC source such as a normal AC line. The DC source may be composed of a bridge rectifier of circuit 7 together with a smoothing capacitor 19, a switch 20 and a connecting line with a suitable plug 21.

Furthermore ordinary rectifiers can be replaced by SCR's in such quantity as required in order to adjust the output characteristic of the DC source to the individual requirements of the inverter. Such SCR's can serve the purpose of automatic motor control, starting control, current limiting and other special operating requirements. It is evident to the expert that this special combination serves as a demonstrating example only and may vary considerably in its practical configuration.

It is furthermore evident to the expert who is familiar with electrical and electronic drawing symbols in what special arrangements and connections such elements can be used. The following explanation shall serve the purpose of explaining by means of a practical example shown in FIG. 2 the meaning of these additional elements. FIG. 2 shows a particular circuit arrangement including a second inverter system of similar design in parallel with the first system. This provides a two-phase inverter system. Each of the parallel inverter circuits is capable to operate as a single-phase inverter providing the presence of appropriate triggering pulses. This combined inverter system generates a two-phase current within the motor load. Within each inverter system inductor 1 represents a field coil of the motor. The only difference concerning the operation of this circuit as compared to the circuit described above in form of a single-phase system consists in the time sequence of the trigger pulses generated by triggering circuit 6 and the different distribution of such pulses to the electronic switching elements. The two inverter systems receive alternate triggering pulses as required. FIG. 2 shows two different possible pulse sequences and their appropriate distribution and variations thereof as applied to output $a$, $b$, $c$ and $d$ of the trigger circuit 6. Sequences $a-c-b-d$ are possible as well as sequences $a-d-b-c$. Changing this sequence causes a change in rotational direction of the motor. The pulse frequency generated within the trigger circuit is four times the required output frequency of the inverter which feeds alternating current to the motor field coils 1. Trigger pulses are spaced at phase angle intervals of 90°. In case of a three-phase inverter system the trigger pulse frequency would be six times the inverter frequency whereby the trigger pulses would have a 60° spacing with respect to the inverter frequency. Other multiphase inverter systems would require suitable extended triggering arrangements.

The short description above serves the purpose of explaining the basic operating principles of this circuit. A more detailed operating description follows.

The essential elements of this improved inverter are shown in FIG. 2 and have already been described shortly before.

As already described above an inverter circuit as shown in FIG. 1 is basically suitable to operate within limited requirements. In this particular case however the inverter load consists of a motor field coil 1. This circumstance alone makes it necessary to add additional circuit elements and members to assure proper performance under all operating conditions.

The motor field coil which represents inductor 1 changes its impedance considerably as a function of motor load. The field coils represent only a part of the oscillating system within the inverter, therefore it is necessary to apply certain compensating means to equalize its change of electrical characteristics under all operating conditions. Such means are shown in FIG. 2, they consist of members 8 to 18. The function of these members is described during an entire cycle of current flow.

Assuming that thyristors 4 and 5 are nonconductive to start with and that thyristor 4 receives the first trigger pulse to render it conductive, current starts to flow from the positive pole of the DC power source 7 through thyristor 4 and the upper portion of inductor 12, through the motor winding 1. This current charges capacitor 3 while at the same time capacitor 2 is being discharged followed by being recharged in opposite polarity. As is known from basic electronics such a current assumes a sine wave function, provided that the circuit contains nearly ideal inductive and capacitive reactances. Furthermore it is known that the voltage across such capacitors can reach values which are higher than the DC supply voltage before current flow ceases. Limiting diodes 10 and 11 with appropriate resistors 15 and 16 serve the purpose to limit such voltages. The exact purpose of this network however is described later.

As soon as the capacitors have reached their full charge and the current has reached zero value the current tends to change its direction and capacitors 2 and 3 tend to discharge over the same current path, which has been used during the charging cycle. During this time period thyristor 5 should be made conductive so that the charge of the capacitors may flow back to the negative pole of the DC power source. Such thyristors can conduct current in one direction only therefore no return current can flow back to the positive pole of the DC supply source. For this reason a diode-resistor network 8, 9, 13 and 14 has been added. Otherwise considerable overvoltages could build up across the thyristors, which could result in their destruction. Since thyristors have thyratronlike characteristics it is important that current flow stops within the circuit before the second thyristor becomes conductive, so that short circuits across the two thyristors which are connected in series can be avoided. For this reason a center tapped choke 12 has been added having the purpose to generate an opposite voltage across the conducting thyristor by taking stored energy from capacitor 17 as soon as the nonconductive thyristor is made conductive. In case current flow should not be completed when the nonconductive thyristor receives its trigger pulse a short circuit would be generated resulting in an inverter fault.

It has been explained before that the time period of a complete current cycle can be adjusted by proper selection of capacitors and inductors. For this particular application however the impedance of the inductor as well as its phase angle are dependent on motor load and therefore can vary very considerably. For this reason means must be provided including such items as inductor 12 and capacitor 17 to provide proper operation of the thyristors and proper commutation between thyristors 4 and 5 under all operating conditions. It is even possible that at certain motor speeds, particularly during the starting cycle as well as under heavy load conditions voltages can be generated within the motor winding 1 which might add up to the voltages generated by the commutation cycle and which might increase or decrease the effective value of the total voltage. Such effects might cause starting difficulties for the motor preventing it from reaching full speed and therefore making a noncompensated half bridge inverter unsuitable for such applications (see FIG. 1).

A considerable improvement is achieved by adding the rectifier-resistor network 10, 11, 15, 16. The basic influence of this network upon the circuit consists of the elimination of induced voltages and their detrimental influences upon the operating characteristics of the motor.

A practical example shown in FIG. 2 shows such an inverter. Additional modifications are possible in order to adapt this circuit to the practical requirements of various motor designs. These modifications may include rectifier-resistance network 10, 11, 15, 16 which is connected to the tap of inductor 1 respectively the motor winding, furthermore the complete elimination of the resistors in this rectifier-resistance network or as well the parallel connection of capacitors to such resistors. Whichever combination of network connections or variations thereof is being chosen, depends upon the motor and the load characteristics of the inverter-motor system. Its proper choice has an essential influence upon the optimum performance which can be achieved for best operating characteristics of the apparatus. Considering the two-phase system in FIG. 2 it is apparent that an additional capacitor 18 can be added between the two phases of the inverter system. This capacitor may be in place of part of capacitors 2 and 3. This circuit may bring certain advantages with respect to size, capacitor value respectively the physical dimensions of such capacitors with respect to the total required capacitance.

I claim:

1. An inverter structurally combined with an inductive, current-consuming appliance for supplying alternating current thereto, comprising series network means including the same number of series networks as there are phases in the appliance, each series network being connected to a DC source and allocated to one phase, each series network including two capacitors, a first connection for the particular phase associated with each series network at the common junction of said two capacitors of said series network, a second connection for said phase associated with said series network, an electronic switching device for each series network for joining said second connection alternatively to each of both ends of said series network; and means for operating the electronic switching device in step with the frequency of the alternating current to be produced and with a phase position corresponding to the phase switched, the capacitors of the individual series networks being made such that the internal impedance of the series network, formed by the two capacitors in the series network, and the inductive component of the load impedance connected to the series network, formed substantially by the part of the consuming appliance connected to the common junction of the two capacitors of the series network, offset each other at least in part at half the switching frequency of the electronic switching device or devices.

2. An inverter as in claim 1, for producing multiphase alternating current in which the phase voltages are not interlinked, for inductive current consuming appliances having galvanically separated phase windings, wherein all the series networks are connected in parallel to a common DC source, each network being connected to a respective phase winding through said first and second connections, said connections associated with the individual phases not being interlinked, but being interconnected only through the inverter circuitry.

3. An inverter as in claim 1, for producing multiphase alternating current in which the phase voltages are interlinked by connection of the phase windings of the appliance to form a polygon and each phase winding terminates in and lies between two phase wires forming adjacent apices of the polygon, wherein each series network is connected to its own separate DC source joined to the DC sources associated with the other series networks only through the inverter circuitry, each network being connected to its respective phase winding by a connecting pair consisting of said first and second connections, said connecting pair associated with the individual phases being interlinked to form a polygon, both the wires in each said connecting pair being joined to two phase wires forming adjacent apices of the polygon and two wires, each from two different ones of said connecting pairs, being joined to each individual phase wire.

4. An inverter as in claim 1, for producing multiphase alternating current in which the phase voltages are interlinked by connection of the phase windings of the appliance to form a star, each phase voltage appearing across a phase winding connected between a common neutral conductor constituting the node of the star and a respective phase wire, wherein each series network is connected to its own separate DC source joined to the DC sources associated with the other series networks only through the inverter circuitry, each network being connected to its respective phase winding by a connecting pair consisting of said first and second connections, said connecting pairs associated with the individual phases being interlinked to form a star, one wire in each said individual connecting pair being connected to one of the phase wires and the other wire in each said individual connecting pair being connected to the neutral conductor.

5. An inverter as in claim 1 for producing multiphase alternating current in which the phase voltages are at least partially interlinked capacitively for inductive current consuming appliances having galvanically separated phase windings, wherein all the series networks are joined in parallel to a common DC source, said first and second connections associated with the individual phases or phase voltages being at least partially interlinked by capacitors.

6. An inverter as in claim 1, including a diode in series with an ohmic resistor inserted between said common junction and each of the two ends of each series network, the diodes being so polarized that they are biased towards cutoff by the DC voltage across the ends of the series network.

7. An inverter as in claim 1 wherein each of the electronic switching devices comprises two alternately operated electronic switches, one of which is placed in the lead between the wire joining the current consuming appliance to the switching device and that end of the series network associated with the latter, while the other is inserted in the lead between the wire joining the current consumer to the switching device and the other end of the series network associated with the latter.

8. An inverter as in claim 7, wherein the electronic switches consist of thyristors, the means for tripping the electronic switch or switches supply each thyristor with trigger pulses at intervals equal to the duration of one cycle of the AC it is desired to produce, and the trigger pulses supplied to the two thyristors belonging to one and the same switching device are separated by the duration of one half-cycle of the AC to be produced.

9. An inverter as in claim 7 including a center tapped impedance coil inserted between the two electronic switches belonging to the same switching device, the center tap of said impedance coil being joined to said second connection.

10. An inverter as in claim 7 including a capacitor connected between said common junction of the series network and the consumer connection of the switching device associated with the series network.

11. An inverter as in claim 7 including a diode in series with an ohmic resistor inserted between the consumer connection of the individual electronic switches and each of the two ends of the series network associated with the switching device, the polarity of the diodes being such that they are biased towards cutoff by the DC voltage across the ends of the series network.

12. An inverter as in claim 1 wherein the load impedance or impedances can be represented in each instance by an equivalent network incorporating a substantially constant inductance and a variable resistance constituting the effective load or part thereof, the minimum value of which is less than the reactance of the inductance at half the switching frequency of the switching device or devices, and wherein the internal impedance of each single series network at half the switching frequency of the switching device is less than half the minimum value of the said variable resistance.

13. An inverter as in claim 1 wherein the inductive current consuming appliance structurally combined with the inverter is an AC motor and in particular an induction motor.

14. An inverter as in claim 13 wherein the capacities of the series network is such that the internal impedance of each individual series network at half the switching frequency of the switching device or devices, when the AC motor is on full load, is equal to the inductive component of the load resistance connected to the series network.

15. An inverter as in claim 1 wherein the DC source or each of the DC sources consists of a rectifier fed from an AC source.

16. An inverter as in claim 15 including several separate DC sources, each connected through a transformer having a separate secondary winding for each DC source, insulated from the other transformer windings, to a common AC source.

17. An inverter as in claim 1 arranged as a frequency changer.

18. An inverter as in claim 17, in which the inductive current consuming appliance consists of an induction motor.

19. An inverter as in claim 18, in which, to regulate the running speed of the induction motor, the switching frequency of the electronic switching device is varied.

* * * * *